United States Patent [19]  
Yusa et al.

[11] 3,959,408  
[45] May 25, 1976

[54] VINYL CHLORIDE RESINS BLENDED WITH TWO STEP GRAFT RESINS

[75] Inventors: Haruhiko Yusa; Hideyuki Hashizume; Masanori Oota; Kazuo Takahashi; Susumu Chubachi, all of Iwaki, Japan

[73] Assignee: Kureha Kagaku Kogyo Kabushiki Kaisha, Tokyo, Japan

[22] Filed: Apr. 9, 1974

[21] Appl. No.: 459,360

[30] Foreign Application Priority Data
Apr. 9, 1973  Japan ............................ 48-40202

[52] U.S. Cl. .................. 260/876 R; 260/879; 260/880 R
[51] Int. Cl.² ................. C08L 51/04; C08L 9/04; C08L 9/08
[58] Field of Search ........... 260/876 R, 879, 880, 260/DIG. 11

[56] References Cited
UNITED STATES PATENTS

| | | |
|---|---|---|
| 3,264,373 | 8/1966 | Whitworth et al. ............... 260/876 R |
| 3,280,219 | 10/1966 | Siebel et al. ..................... 260/880 R |
| 3,636,138 | 1/1972 | Beer .............................. 260/876 R |
| 3,644,249 | 2/1972 | Ide et al. ........................ 260/876 R |
| 3,671,607 | 6/1972 | Lee ............................... 260/876 R |
| 3,842,144 | 10/1974 | Tanaka et al. ................... 260/876 R |
| 3,853,968 | 12/1974 | Bortnick et al. ................. 260/876 R |

Primary Examiner—Murray Tillman  
Assistant Examiner—Thurman K. Page  
Attorney, Agent, or Firm—Wenderoth, Lind & Ponack

[57] ABSTRACT

Vinyl chloride resin composition having excellent impact resistance, weather resistance and processability which comprises a vinyl chloride resin and a multicomponent resin blended therewith, said multicomponent resin being prepared by (1) graft polymerizing acrylonitrile, and a vinyl monomer which is methyl methacrylate and/or styrene, and a cross-linking agent onto cross-linked copolymer rubber obtained by emulsion-polymerizing an alkyl acrylate, butadiene and a cross-linking agent or onto a cross-linked terpolymer rubber obtained by emulsion-polymerizing an alkyl acrylate, butadiene, methyl methacrylate and a cross-linking agent and (2) further graft polymerizing thereonto an alkyl methacrylate and a cross-linking agent. Quantitative limitations are included.

4 Claims, No Drawings

VINYL CHLORIDE RESINS BLENDED WITH TWO STEP GRAFT RESINS

BACKGROUND OF THE INVENTION

The present invention relates to a method of producing vinyl chloride resin compositions having excellent impact resistance and simultaneously satisfying requirements for weather resistance as well as processability.

More particularly, the present invention is concerned with resin compositions comprising vinyl chloride resins with multicomponent resins incorporated therein, said multicomponent resin being prepared by graft polymerizing acrylonitrile, a vinyl monomer essentially containing alkyl methacrylates and a cross-linking agent onto a cross-linked copolymer rubber obtained by emulsion-polymerizing an alkyl acrylate and butadiene in the presence of a cross-linking agent or onto a cross-linked terpolymer rubber obtained by emulsion-polymerizing an alkyl acrylate, butadiene, and methyl methacrylate in the presence of a cross-linking agent under specific conditions.

A great number of attempts have been heretofore made to improve the impact strength of vinyl chloride resins. Especially, an impact-resistance-improving resin obtained by graft polymerizing styrene and methylmethacrylate or styrene and acrylonitrile onto a butadiene-based rubber, which is hereinafter referred to as ABS resin, has excellent properties and has been widely used. However, a vinly chloride resin containing such ABS resin mixed therein has poor weather resistance and, therefore, cannot be used outdoors.

That is, the ABS-modified vinyl chloride resin truely possesses high impact resistance immediately after it is moulded, but it is observed that, when it is once used in the outdoors, it cannot maintain such a high impact strength, and its strength is rapidly reduced. For this reason, such resins are greatly limited in their use as construction materials.

The reduction in strength is considered primarily due to the ultraviolet degradation of the butadiene component contained in the ABS resin. On the basis of this consideration, attempts have been made to develop a reinforcing agent comprising rubber components excellent in weather resistance other than butadiene-based rubber components. Among them, representative reinforcing agents include copolymer rubbers of ethylene and vinyl acetate onto which vinyl chloride is graftpolymerized, acrylate-based rubbers onto, which monomers such as styrene, methylmethacrylate, acrylonitrile, etc. are graftpolymerized, and the like.

However, some of these agents impair the mechanical properties of vinyl chloride resin compositions relating to such as tensile strength, softening temperature, to a remarkable extent, while others are unable to impart sufficient strength to the vinyl chloride resin. Further, a great disadvantage common to these reinforcing agents in that the impact strength of vinyl chloride resin compositions containing these reinforcing agents vary to a much greater extent depending upon the processing conditions under which these compositions are processed as compared with the vinyl chloride resin compositions containing ABS resin. That is, some of these resin compositions certainly have an appreciable impact strength under suitable moulding and processing conditions, but these resin compositions, in general, have the disadvantage of their impact strengths being greatly varied with change in these conditions (for example, the degree of kneading).

The degree of kneading during the moulding and processing of the vinyl chloride resin changes to a remarkable extent depending upon the type and operation conditions of the moulding machine and the type and amount of processing aids added in the process. It is thus undesirable for practical purpose that the impact strength of the moulded articles be remarkably reduced according to the change of the degree of kneading. In order to overcome this disadvantage, there have been proposed various methods such as, for example, a method comprising pre-treating a rubber component with a peroxide before graft polymerizing a grafting component thereonto so as to form active sites for graft polymerization or a method comprising using a copolymer of butadiene and an alkyl acrylate containing larger proportion of butadiene. However, the former is still unsatisfactory in imparting strength, while the latter entails the problem of weather resistance.

SUMMARY OF THE INVENTION

We have undertaken studies in order to solve these problems and, as a result, have succeeded in obtaining a vinyl chloride resin composition having high impact strength over a wide range of processing conditions and simultaneously satisfying weather resistance.

The present invention provides a vinyl chloride resin composition comprising 95 to 70 parts, preferably 95 to 80 parts, by weight of a vinyl chloride resin and 5 to 30 parts, preferably 5 to 20 parts, by weight of a multicomponent resin blended therewith. The multicomponent resin is a resin which is obtained by (1) polymerizing 45 to 10 parts, preferably 35 to 10 parts, by weight of a monomer mixture comprising 10 to 50%, by weight of acrylonitrile, 50 to 90%, by weight of methyl methacrylate and/or styrene, which monomeric mixture contains 0.01 to 3%, by weight of a copolymerizable cross-linking agent added to a latex containing 50 to 80 parts, preferably 60 to 80 parts, by weight of a cross-linked rubber copolymer obtained by emulsionpolymerizing a monomer mixture comprising 40 to 95%, by weight of an alkyl acrylate having from 2 to 12, preferably 4 to 8, carbon atoms in the alkyl radical, 5 to 40%, by weight of butadiene, 0 to 30%, by weight of methyl methacrylate, and 0.01 to 3%, by weight of a cross-linking agent and (2) thereafter polymerizing 5 to 25 parts, preferably 10 to 20 parts, by weight of an alkyl methacrylate having from 1 to 4, carbon atoms in the alkyl radical containing 0.01 to 3%, by weight of a copolymerizagle cross-linking agent added thereto.

DETAILED DESCRIPTION

The multicomponent resin according to the present invention can provide a vinyl chloride resin composition having high impact strength over a wide range of processing conditions and simultaneously satisfying weather resistance requirement which is an object of the present invention only when it meets the following three requirements.

The first requirement is that the cross-linked rubber components has an alkyl acrylate as a primary component and a small amount of butadiene. With a butadiene content not greater than 5% by weight in the cross-linked rubber copolymer, the impact resistance of the vinyl chloride resin composition obtained is remarkably reduced.

While with a butadiene content not less than 40% by weight, the weather resistance thereof is remarkably reduced. Furthermore, a methyl methacrylate content of not less than 30% by weight increases the glass transition temperature of the resin composition obtained and reduces the impact resistance thereof. Further, the rubber polymer should be in amounts of 50 to 80 parts by weight in the multicomponent resin. This is because the extremely higher content of the rubber component leads to the agglomeration of the multicomponent resin during salting out or drying process which interferes with a uniform blending with vinyl chloride resin powders, whereby no uniform dispersion of the multiponent resin into the vinyl chloride resin can be eventually attached. On the other hand, with a rubber component of less than 50 parts by weight, the effect of imparting impact resistance is small, and a larger amount of the multicomponent resin is required for addition. This is not economical and further affects the physical properties of the vinyl chloride resin to a great extent.

The second requirement is that the graft polymerization should be carried out in two steps, namely, a first step wherein acrylonitrile is used as one essential ingredient of the first graft component and a second step wherein an alkyl methacrylate is used as one essential ingredient of the second graft component.

The necessity of the incorporation of acrylonitrile in only the first graft component is due to the following reasons: we have found that the incorporation of acrylonitrile in the first graft component makes possible a great increase in impact resistance even when the blended quantity thereof is small, while on the other hand, when the acrylonitrile is used as the rubber component or incorporated in the second graft component, effects which are more remarkable than those when the acrylonitrile is used as the first graft component cannot be attained. However, it is unfavourable from the standpoint of the heat stability of the resin composition that the acrylonitrile content in the first graft component exceed 50% by weight. It is also unfavourable that the acrylonitrile be less than 10% by weight with respect to the first graft component because the effect of imparting impact resistance is lowered under the condition of low degree of kneading. The alkyl methacrylates as the ingredient of the second graft component are limited to those having from 1 to 4 carbon atoms in the alkyl radical. This is because the polymer containing such as alkyl methacrylate is highly compatible with the vinyl chloride resin.

In addition, the first graft polymer should be present in amounts of 10 to 45 parts, preferably 10 to 35 parts, by weight in the multicomponent resin, and the second graft polymer should be present in amounts of 5 to 25 parts, preferably 10 to 20 parts, by weight in the multicomponent resin. In the case where the first graft polymer is less than 10 parts by weight, the impact resistance of the resin is reduced. On the other hand, in the case where the first graft polymer is greater than 45 parts by weight, the compatibility with the vinyl chloride resin is reduced or the impact resistance is decreased because the second graft polymer or the rubber polymer is decreased in amount.

The third requirement is that a cross-linking agent should be always incorporated in the graft polymer as well as the "trunk" rubber polymer. The incorporation of a cross-linking agent in the rubber polymer is a conventional practice, but the incorporation thereof to the graft polymer provides excellent impact resistance under broader moulding and processing conditions.

The simultaneous satisfaction of the above stated three requirements is essential for the attainment of the objects of the present invention. For instance, unless the second requirement is satisfied, no satisfactory effects can be achieved even if the other two requirements are satisfied. This is true with other cases.

The cross-linking agents used in the polymerization should be selected from those which are well copolymerizable with the monomer mixture in the respective polymerization stages. The preferred cross-linking agents include aromatic multi vinyl compounds such as divinyl benzene, and divinyl toluene; dimethacrylates such as ethylene glycol dimethacrylate, diethylene glycol dimethacrylate, triethylene glycol dimethacrylate; diacrylates such as ethylene glycol diacrylate, diethylene glycol diacrylate, triethylene glycol diacrylate, 1,3-butanediol diacrylate and the like.

When the multicomponent resin of the present invention is prepared, cross-linked rubber copolymer latex particles more than 95% of which fall within the range of from 0.05 to 0.2 $\mu$, may be used in in the emulsion polymerization method known in the art. However, when agglomerated rubber particles having an average particle size of 0.12 to 0.5 $\mu$ which are obtained by adding an agglomerating agent to the above-mentioned rubber latex to transform the particles into microagglomerates are used, the effect of imparting impact resistance is more greatly improved than is obtained with the latex particles which have undergone no agglomerating operation, whatsoever. The agglomerating agents used in the process of the present invention may be mineral acids such as hydrochloric acid and sulfuric acid, or organic acids such as tartaric acid and malic acid which have been conventionally used as coagulating agents for latex, but any other aggregating agents may also be used.

The vinyl chloride resin used in the process of the present invention may be vinyl chloride homopolymer or copolymers of vinyl chloride content of more than about 70%, preferably more than about 80% by weight, with an ethylenically unsaturated monomer copolymerizable therewith such as ethylene, propylene, vinyl acetate, methylmethacrylate and the like.

The following Examples will illustrate the present invention in more detail. All parts given are by weight.

EXAMPLE 1

The ingredients given below were charged into an autoclave and they were reacted at a temperature of 45°C for 16 hours while the autoclave being rotated. The yield of polymerization was almost 100%.

| Cross-linked copolymer rubber substrate recipe | |
|---|---|
| | parts |
| 2-Ethylehexyl acrylate | 35 |
| Butadiene | 20 |
| Methyl methacrylate | 10 |
| Ethylene glycol dimethacrylate | 0.65 |
| Diisopropyl benzene hydroperoxide | 0.13 |
| Ferrous sulfate (FeSO$_4$.7H$_2$O) | 0.002 |
| Disodium ethylene diamine tetraacetate | 0.003 |
| Formaldehyde sodium sulfoxylate | 0.03 |
| Potassium oleate | 0.4 |
| Sodium pyrophosphate | 0.1 |
| Distilled water | 175 |

0.5 parts of potassium oleate and 0.065 parts of sodium dioctyl sulfosuccinate were added to the resulting rubber latex to stabilize it, the parts being based on the total amount of the rubber latex. Then, 50 parts of an aqueous solution containing 0.2% of hydrochloric acid was gradually added to the stabilized latex to agglomerate the rubber particles in the latex. After being subjected to the agglomerating operation, the rubber particles of the latex were found to grow into an average particle size of 0.15 μ from the original size of 0.07 μ. The PH value of the latex was adjusted to 9.5 by adding aqueous solution of sodium hydroxide, and to the resulting latex was added the first graft component given below to start the graft polymerization. The polymerization was carried out at a temperature of 60°C for 4 hours. The yield of polymerization was about 98%. Subsequently, the second graft component given below was added to the resulting latex from the first graft polymerization to start the second graft polymerization. The polymerization was carried out at a temperature of 60°C for 7 hours.

| The first graft component recipe | |
|---|---|
| | parts |
| Styrene | 5 |
| Methyl methacrylate | 5 |
| Acrylonitrile | 10 |
| Ethylene glycol dimethacrylate | 0.15 |
| Diisopropyl benzene hydroperoxide | 0.02 |
| Formaldehyde sodium sulfoxylate | 0.01 |
| The second graft component recipe | |
| Methyl methacrylate | 15 |
| Ethylene glycol dimethacrylate | 0.114 |
| Diisopropyl benzene hydroperoxide | 0.015 |
| Formaldehyde sulfoxylate | 0.005 |

The resultant latex contained about 30% of polymers, which indicated a substantial completion of the polymerization. As an anti-oxidant, 0.5 parts of 2,6-di-tert-butylparacresol and 0.5 parts of dilauryl-thiodipropionate were added to the polymer latex and the resulting mixture was subjected to salting out, dehydration and drying to give a multicomponent resin powder.

10 parts of the multicomponent resin, 3.6 parts of a lead-based stabilizer consisting of 0.3 parts tribasic lead sulfate, 2.3 parts lead stearate, 0.3 parts dibasic lead stearate, 0.1 parts calcium stearate, 0.3 parts stearic acid, 0.3 parts titanium oxide and 90 parts of a vinyl chloride resin (degree of polymerization: 1000) were intimately blended in a Henshell mixer. The resulting mixture was kneaded on a 8-inch testing roller under the two kneading conditions of a surface temperature of 140°C and a period of 2 minutes, and a surface temperature of 170°C and a period of 5 minutes. These kneading periods of 2 and 5 minutes are not the time after the mixture was gelled and wound round the roller mill, but the time after the charging of the mixture into the mill was begun.

The former condition was selected as a representative of a low kneading condition and the latter was selected as a representative of a high kneading condition. The respective sheets kneaded under the two different kneading conditions were pressed at a temperature of 200°C under a pressure of 150 kg/cm² to form samples in the form of a plate 3 mm thick.

Charpy impact value (measured according to JIS-K7111) was 184 kg.cm/cm² for the sample of the low kneading condition and 188 kg.cm/cm² for the sample of the high kneading condition and both of the samples exhibited ductile rupture. These Charpy impact values were remarkably higher than that of 6 kg.cm/cm² for the vinyl chloride resin alone.

Then, these samples were subjected to an artificial accelerated weathering test by means of Weather-0-Meter. The Charpy impact values after an ultra-violet irradiation period of 400 hours were both 143 kg.cm/cm².

EXAMPLES 2 to 5 and COMPARATIVE EXAMPLES 1 to 8

Various vinyl chloride resin compositions as indicated in the Table were prepared by using the same polymerization conditions described in Example 1. Their physical properties were determined in the same manner as in Example 1.

As can be seen from Table, Examples 1 to 5 which satisfty the three requirements of the present invention exhibit excellent impact resistance and weather resistance under the low kneading condition as well as the high kneading condition. However, it is apparent from Comparative Examples that the resin composition which does not satisfy a mere one requirement according to the present invention has lower impact resistance or poor weather resistance under the low kneading condition. That is, as is seen in Comparative Example 2, if butadiene is excessive, the impact resistance is high, while the weather resistance is extremely poor. On the other hand, as is seen in Comparative Example 7, if 2-ethylhexyl acrylate is excessive and butadiene is too small, the impact resistance is low even under the high kneading condition. Further, when acrylonitrile is not added to the first graft polymerization component as in Comparative Examples 1 and 3, the impact resistance is reduced under the low kneading condition even if the other conditions are satisfied. Besides, if acrylonitrile is used as a component other than the first graft polymerization component, i.e. the rubber component or the second graft polymerization component, the impact resistance is reduced under the low kneading condition as in Comparative Examples 4, 5 and 6.

Additionally, when a cross-linking agent is not added to the graft component as in Comparative Example 8, the impact resistance is reduced as well under the low kneading condition even if the other conditions are satisfied.

In view of the above, a vinyl chloride resin composition which can maintain excellent impact resistance and weather resistance under a broad moulding and processing condition may be obtained only when the requirements according to the present invention all are satisfied.

| | Composition of multicomponent resin (unit: part by weight) | | | | | | | | | | | | Physical properties of vinyl chloride resin composition | | |
|---|---|---|---|---|---|---|---|---|---|---|---|---|---|---|---|
| | "Trunk" rubber polymer | | | | | | First graft component | | | Second graft component | | | Charpy impact value (kg.cm/cm²) Roll kneading condition | | Charpy impact value after exposure to weather-O-Meter for 400 hours |
| | 2EHA | BA | BU | MMA | AN | EDMA | ST | AN | MMA | EDMA | MMA | AN | EDMA | 140°C 2min. | 170°C 5min. | (kg.cm/cm²) |
| Example 1 | 35 | 0 | 20 | 10 | 0 | 0.65 | 5 | 10 | 5 | 0.152 | 15 | 0 | 0.114 | 184 | 188 | 143 |
| " 2 | 35 | 0 | 20 | 10 | 0 | 0.65 | 11 | 4 | 5 | 0.152 | 15 | 0 | 0.114 | 143 | 174 | 115 |
| " 3 | 35 | 0 | 20 | 10 | 0 | 0.65 | 13 | 2 | 5 | 0.152 | 15 | 0 | 0.114 | 62 | 172 | 55 |
| " 4 | 50 | 0 | 15 | 0 | 0 | 1.3 | 11 | 4 | 5 | 0.152 | 15 | 0 | 0.114 | 111 | 155 | 92 |
| " 5 | 0 | 50 | 15 | 0 | 0 | 1.3 | 11 | 4 | 5 | 0.152 | 15 | 0 | 0.114 | 106 | 147 | 89 |
| Comparative Example 1 | 35 | 0 | 20 | 10 | 0 | 0.65 | 15 | 0 | 5 | 0.152 | 15 | 0 | 0.114 | 33 | 170 | 25 |
| " 2 | 15 | 0 | 50 | 0 | 0 | 0.65 | 11 | 4 | 5 | 0.152 | 15 | 0 | 0.114 | 152 | 175 | 12 |
| " 3 | 50 | 0 | 15 | 0 | 0 | 1.3 | 15 | 0 | 5 | 0.152 | 15 | 0 | 0.114 | 13 | 149 | — |
| " 4 | 35 | 0 | 20 | 6 | 4 | 0.65 | 11 | 4 | 5 | 0.152 | 15 | 0 | 0.114 | 30 | — | — |
| " 5 | 35 | 0 | 20 | 10 | 0 | 0.65 | 15 | 0 | 5 | 0.152 | 10 | 5 | 0.114 | 26 | — | — |
| " 6 | 50 | 0 | 15 | 0 | 0 | 1.3 | 11 | 4 | 5 | 0.152 | 10 | 5 | 0.114 | 35 | — | — |
| " 7 | 55 | 0 | 0 | 10 | 0 | 0.65 | 11 | 4 | 5 | 0.152 | 15 | 0 | 0.114 | 18 | 32 | — |
| " 8 | 35 | 0 | 20 | 10 | 0 | 0.65 | 11 | 4 | 5 | 0 | 15 | 0 | 0 | 56 | — | — |

2EHA — 2 ethylhexyl acrylated
AN — acrylonitrile
BA — n-butyl acrylate
ST — styrene
BU — butadiene
EDMA — ethylene glycol dimethacrylate
MMA — methyl methacrylate

We claim:

1. A method for producing a vinyl chloride resin composition having excellent impact resistance over a wide range of processing conditions, weather resistance, and processability, which comprises blending 95 to 70 parts by weight of a vinyl chloride resin and 5 to 30 parts by weight of a multicomponent resin, said multicomponent resin being a two-step graft polymerizate prepared by (1) graft-polymerizing 45 to 10 parts by weight of a monomer mixture comprising 10 to 50% by weight of acrylonitrile and 50 to 90% by weight of a member selected from the group consisting of methyl methacrylate, styrene, and mixtures of methylmethacrylate and styrene, containing 0.01 to 3% by weight of a cross-linking agent copolymerizable therewith onto a latex containing 50 to 80 parts by weight of a cross-linked rubber copolymer obtained by emulsion-polymerization of a monomer mixture comprising 40 to 95% by weight of an alkyl acrylate having from 2 to 12 carbon atoms in the alkyl radical, 5 to 40% by weight of butadiene, 0 to 30% by weight of methyl methacrylate and 0.01 to 3% by weight of a cross-linking agent copolymerizable therewith and then (2) graft-polymerizing 5 to 25 parts by weight of an alkyl methacrylate having from 1 to 4 carbon atoms in the alkyl radical containing 0.01 to 3% by weight of a cross-linking agent copolymerizable therewith onto the product of the first step.

2. A method for producing a vinyl chloride resin composition as claimed in claim 1, in which said composition comprises 95 to 80 parts by weight of said vinyl chloride resin and 5 to 20 parts by weight of said multicomponent resin.

3. A method for producing a vinyl chloride resin composition as claimed in claim 1, in which said multicomponent resin is obtained by a two-step graft polymerization, which comprises (1) graft-polymerizing 10 to 45 parts by weight of a monomer mixture comprising 10 to 50% by weight of acrylonitrile, 90 to 50% by weight of methyl methacrylate and styrene and 0.01 to 3% by weight of a cross-linking agent copolymerizable therewith onto a latex containing 50 to 80 parts by weight of a cross-linked rubber copolymer obtained by emulsion-polymerization of a monomer mixture comprising 40 to 95% by weight of an alkyl acrylate having 2 to 0.1 carbon atoms in the alkyl radical, 5 to 40% by weight of butadiene, 0.1 to 30% by weight of methyl methacrylate and 0.01 to 3% by weight of a cross-linking agent copolymerizable therewith and then (2) graft-polymerizing 5 to 25 parts by weight of an alkyl methacrylate having from 1 to 4 carbon atoms in the alkyl radical containing 0.01 to 3% by weight of a cross-linking agent copolymerizable therewith onto the product of the first step.

4. A method for producing a vinyl chloride resin composition as claimed in claim 1, in which said multicomponent resin is obtained by a two-step graft polymerization, which comprises (1) graft-polymerizing 10 to 45 parts by weight of a monomeric mixture comprising 10 to 50% by weight of acrylonitrile and 90 to 50% by weight of a member selected from the group consisting of methylmethacrylate, styrene and mixtures of methylmethacrylate and styrene and 0.01 to 3% by weight of a cross-linking agent copolymerizable therewith onto a latex containing 50 to 80 parts by weight of a cross-linked rubber copolymer obtained by emulsion-polymerization of a monomer mixture comprising 70 to 95% by weight of an alkyl acrylate having 2 to 12 carbon atoms in the alkyl radical, 5 to 30% by weight of butadiene, and 0.01 to 3% by weight of a cross-linking agent copolymerizable therewith and then (2) graft-polymerizing 5 to 25 parts by weight of an alkyl methacrylate having from 1 to 4 carbon atoms in the alkyl radical containing 0.01 to 3% by weight of a cross-linking agent copolymerizable therewith onto the product of the first step.

* * * * *